United States Patent
Farnsworth et al.

(10) Patent No.: US 6,855,355 B2
(45) Date of Patent: Feb. 15, 2005

(54) COLORED AND/OR FLAVORED FROZEN FRENCH FRIED POTATO PRODUCT AND METHOD OF MAKING

(75) Inventors: Susan Farnsworth, Fruitland, ID (US); Dwane B. Benson, Payette, ID (US); Craig Doan, Weiser, ID (US); Joseph DeStephano, Pittsburgh, PA (US)

(73) Assignee: H. J. Heinz Company, Pittsburgh, PA (US)

( * ) Notice: Subject to any disclaimer, the term of this patent is extended or adjusted under 35 U.S.C. 154(b) by 0 days.

(21) Appl. No.: 10/099,756

(22) Filed: Mar. 18, 2002

(65) Prior Publication Data

US 2002/0150656 A1 Oct. 17, 2002

Related U.S. Application Data

(60) Provisional application No. 60/283,164, filed on Apr. 12, 2001.

(51) Int. Cl.$^7$ ............................................. A23L 1/217
(52) U.S. Cl. ..................... 426/102; 426/250; 426/262; 426/302; 426/637
(58) Field of Search ................................ 426/102, 250, 426/262, 302, 438, 637

(56) References Cited

U.S. PATENT DOCUMENTS

| | | |
|---|---|---|
| 3,424,591 A | 1/1969 | Gold |
| 3,634,105 A * | 1/1972 | Beck et al. .............. 426/637 X |
| RE27,531 E | 12/1972 | Murray et al. |
| 3,751,268 A | 8/1973 | Van Patten et al. |
| 4,082,855 A | 4/1978 | Citti et al. |
| 4,317,842 A | 3/1982 | El-Hag et al. |
| 4,698,230 A * | 10/1987 | Willard ................... 426/637 X |
| 5,372,830 A | 12/1994 | Muller |
| 5,484,617 A | 1/1996 | Tiffany |

* cited by examiner

Primary Examiner—Arthur L. Corbin
(74) Attorney, Agent, or Firm—Burns, Doane, Swecker & Mathis, L.L.P.

(57) ABSTRACT

A potato product includes potato pieces possessing unique color characteristics through the addition of a food grade color selected from, individually or in combination; xanthine, monoazo, pyrazolone, triphenylmethane, or indigoid color compounds or aluminum salts of xanthine, monoazo, pyrazolone, triphenylmethane and indigoid color compounds extended on a substratum of alumina hydrate. The potato pieces can be formed potato pieces produced by, for example, extruding a potato mixture in which is incorporated the food grade color. Alternatively, the potato pieces can be immersed in a batter solution containing the food grade color. The potato pieces can also be provided with flavoring characteristics by adding flavoring agents to the potato mixture or the batter solution.

30 Claims, 2 Drawing Sheets

COLORED AND/OR FLAVORED FROZEN FRENCH FRIED POTATO PRODUCT AND METHOD OF MAKING

This application is based on and claims priority under 35 U.S.C. §119(e) with respect to U.S. Provisional Patent Application No. 60/283,164 filed on Apr. 12, 2001, the entire content of which is incorporated herein by reference.

FIELD OF THE INVENTION

The present invention generally relates to colored and/or flavored potato products, and methods for producing such products. More particularly, the present invention pertains to colored and/or flavored frozen French fried potato products, and methods for producing such products.

BACKGROUND OF THE INVENTION

French fried potato products have long been popular as a food item. French fried potato products which have been frozen and can be relatively easily reheated or reconstituted by the consumer in an oven, toaster oven, microwave oven or deep fat frying are particularly popular. Various methods and techniques have been proposed and utilized for preparing such products so that they have a desirable French fried appearance and pleasing textural qualities.

One type of known frozen French fried potato product is a formed potato product. In this type of product, potato pieces are cooked and then appropriately processed into a potato mash or mixture. The potato mash or mixture is mixed with other ingredients such as binders and salt, and the resulting mixture is then formed into the desired potato product through use of an extruder. The formed potato product is then fried, frozen and packaged.

Another form of French fried potato product involves the use of raw potatoes that are at least partially cooked by blanching and/or steaming, optionally dried, and then fried, frozen and packaged. With these types of potatoes, it is known in the industry to apply a batter coating that coats the outer surface of the potato pieces. After the batter coating is applied, the potato pieces are subjected to final frying, followed by freezing and packaging as mentioned above. The batter coating is applied for purposes of improving certain characteristics of the potato product. In particular, with the batter coating, the potato product is better able to maintain its crispness characteristics, upon reheating or reconstituting by the consumer, for a longer period of time than would otherwise be the case.

U.S. Pat. No. 5,484,617 describes a process for preparing golden yellow potato products that involves passing the potato pieces through an aqueous solution containing annatto. The patent describes preparing raw potato pieces in a conventional manner for partial cooking in a water bath or steam chamber. The potato pieces are then passed through an aqueous solution containing annatto so that the potato pieces emerging from the aqueous solution have a light golden yellow color. As the potato pieces are passed through the aqueous solution containing annatto, the solution is readily absorbed by the gelatinized surfaces of the potato pieces. The potato pieces are then cooked and frozen for packaging and sale. The consumer can then reheat or reconstitute the potato pieces for consumption through use of an oven or by deep frying.

U.S. Pat. No. Re 27,531 discloses a process for treating potato products from reconstituted raw potatoes or sliced raw potatoes. The potato pieces are dipped in an amylose coating, followed by cooking in hot edible cooking oil. The amylose coating is intended to produce a product having improved appearance, texture and taste when used to coat potato products prior to deep frying.

U.S. Pat. No. 3,751,268 discloses a method of coating potato pieces with ungelatinized, unmodified, high amylose starch prior to being cooked in edible frying oil. By coating the potato products with ungelatinized, unmodified, high amylose starch prior to deep fat frying, the oil absorption during deep fat frying is reduced and the resulting product is said to have an improved textural quality.

U.S. Pat. No. 3,424,591 discloses a method of surface treating potato pieces with a synthetic or chemically modified natural hydrocolloid prior to deep fat frying to produce French fried potato products having a lighter, more even color, a firmer texture, a higher residual moisture content, and a reduced oil content. The patent describes dipping partially cooked potato pieces in non-ionic alkylcellulose ether, such as hydroxypropylmethyl cellulose, or carboxymethylcellulose, generally designated as an aqueous hydrocolloid solution. This coating is said to inhibit natural browning, with the primary purpose of the disclosed hydrocolloid being to form a viscous coating preventing penetration of oil during the subsequent cooking period.

As evidenced by at least some of these patents, there is an interest in the industry to provide consumers with frozen French fried potato products having a golden yellow color and preferred textural characteristics. However, no attention has been given to providing frozen French fired potato products having unique color characteristics and/or unique taste qualities which differ significantly from known frozen French fried potato products. There thus exists an interest and need in the marketplace, particularly amongst younger consumers, for frozen French fried potato products that are colored and/or flavored in a way that is uniquely appealing and different from anything commercially available.

SUMMARY OF THE INVENTION

According to one aspect, a method for preparing a potato product involves producing potato pieces having a desired shape from potatoes, and passing the potato pieces through a batter solution containing a food grade color selected from the group consisting essentially of, individually or in combination; xanthine, monoazo, pyrazolone, triphenylmethane, or indigoid color compounds or aluminum salts of corresponding FD&C dyes extended on a substratum of alumina hydrate.

In accordance with another aspect, a method of preparing potato products involves at least partially cooking potatoes in a water bath or a steam chamber, producing potato mash from the at least partially cooked potatoes, mixing the potato mash with at least one of an artificial and/or natural sweetener and food grade color to produce a potato mixture, forming the potato mixture into potato pieces, frying the potato pieces, and freezing the potato pieces.

According to another aspect, a prepared colored French fried potato product comprises potato pieces which have been passed through a colored batter solution containing food grade color to coat the potato pieces and impart color to the potato pieces, and subsequently fried. The food grade color in the batter solution is selected from the group consisting essentially of, individually or in combination; xanthine, monoazo, pyrazolone, triphenylmethane, or indigoid color compounds or aluminum salts of corresponding FD&C dyes extended on a substratum of alumina hydrate.

In accordance with a further aspect, a prepared sweet flavored French fried potato product comprises potato pieces produced through addition of a natural and/or artificial sweetener to impart a sweet taste to the potato product and subsequently fried.

BRIEF DESCRIPTION OF THE DRAWING FIGURES

The foregoing and additional features and characteristics of the present invention will become more apparent from the following detailed description considered with reference to the accompanying drawing figures.

DETAILED DESCRIPTION OF THE INVENTION

Generally speaking, the present invention provides a potato product (for example, frozen French fried potato product) having uniquely appealing color and/or flavor characteristics. The color and/or flavor characteristics can be imparted to the potato product in several ways. According to one aspect, the potato product is produced by at least partially cooking potato pieces, producing a potato mash or mixture from the at least partially cooked potato pieces, adding ingredients to the potato mash or mixture that include a coloring agent and/or flavoring, forming the resulting potato mixture into potato products having the desired form, and then frying, freezing and packaging the French fried potato product.

Alternatively, potato pieces (e.g., whole potatoes or potatoes which have been cut into smaller parts) are at least partially cooked and then immersed in a batter solution. The batter solution includes a color agent(s) and/or flavorings to impart unique color and flavor attributes to the potato pieces. The batter coated potato pieces are then fried, frozen and subsequently packaged to result in frozen French fried potato products that are uniquely colored and/or flavored.

In a further variation, formed potato products produced by forming a potato mixture into the desired potato product form can be colored and/or flavored by immersing the formed potato product in the coloring agent(s) and/or flavoring containing batter solution described above. In this way, the unique color and/or flavor characteristics are imparted after the formed potato product is produced rather than before.

Except for the specific details described below that are employed to impart unique color and/or flavor characteristics to the formed frozen French fried potato product, the process used here to produce the formed frozen French fried potato product is similar to processes known in the industry for producing formed French fried potato products. U.S. Pat. No. 4,082,855 issued to Citti et al. on Apr. 4, 1978, the disclosure of which is incorporated herein by reference, describes such a known process for producing a formed potato product.

Figure 1:
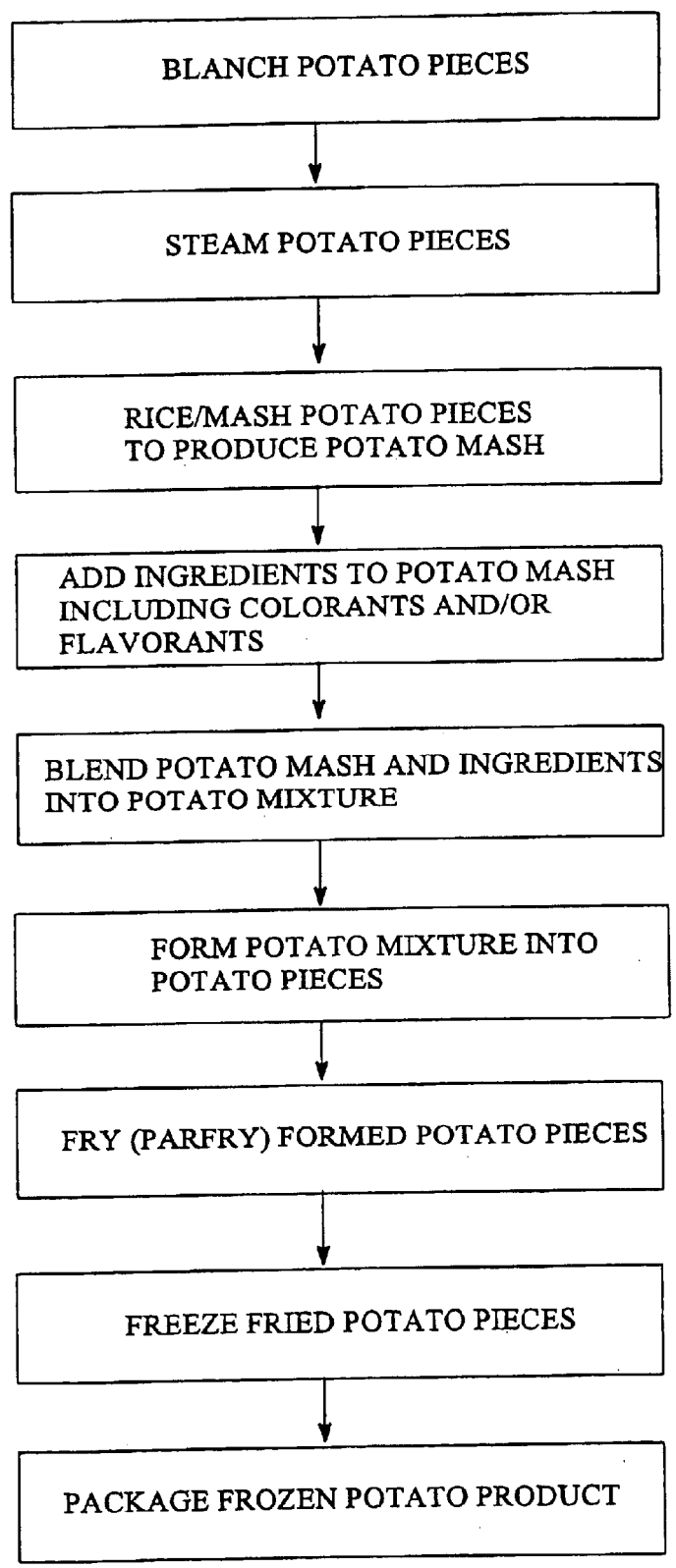
FIG. 1 is a process flow diagram illustrating one process in accordance with the present invention for producing French fried potato products having unique color and/or flavor characteristics.

FIG. 1 generally illustrates the process employed here to produce formed frozen French fried potato products. The process begins with the use of potato pieces. The potato pieces can be whole potatoes, cut-up potatoes or offal resulting from French fried potato production. The potato pieces are blanched in water for an appropriate amount of time to inactivate enzymatic activity and soften the potato structure. By way of example, the potato pieces can be blanched for 5–14 minutes at 160° F. to 190° F.

The blanched potato pieces are then steamed thoroughly for an appropriate time at an appropriate temperature. In this way, the potato pieces are generally completely softened for purposes of preparing them for subsequent steps in which the potato pieces are formed into a potato mash. By way of example, the blanched potato pieces can be steamed at 212° F. for a period of 12–30 minutes. This steaming also creates a favorable granular-type structure commonly referred to as mealiness in baked potatoes.

Following the steaming, the potato pieces are riced, mashed or otherwise suitably processed using commercially available and currently used equipment to transform the cooked potato pieces into a relatively smooth uniform potato mash. Once the potato mash is produced, ingredients are added to the mash. The ingredients include typical ingredients used to produce formed potato products such as known binders (e.g., potato flakes and xanthan gum), salt and other ingredients. Other possible binders that could be used include starches, methylcellulose, other gums and other hydrocolloids. Other possible ingredients that could be added include dextrose, SAPP (sodium acid pyrophosphate) and processing aids such as monoglycerides and diglycerides. These various ingredients, which are typically in dry form, are mixed together with the potato mash in a mixer in a manner known in the industry.

According to the present invention, in addition to the aforementioned known ingredients that are added to the potato mash, one or more coloring agents and/or flavorings are added as ingredients to the potato mash The one or more coloring agents and/or flavorings are specifically selected so that the formed potato product possesses the desired color and/or flavor characteristics.

From the standpoint of coloring agents, appropriate coloring agents are selected to produce a formed potato product having a color not typically associated with frozen potato products. Examples of such colors for the frozen formed French fried potato product include, but are not limited to, red, blue, green, purple, orange and yellow. To produce formed frozen French fried potato products having these and possibly other colors, coloring agents in the form of food grade color are added to the potato mixture. Any certified food grade color can be used in this regard, with the selected food grade color(s) and amount/proportions of such color(s) being selected based on the desired color in the final formed potato product. The coloring agents are preferably selected so as not to impart any flavor to the potato product.

Preferred food grade colors include FD&C Red No. 3, FD&C Red No. 40, FD&C Red No. 2, FD&C Yellow No. 6, FD&C Yellow No. 5, FD&C Green No. 3, FD&C Blue No. 1 and FD&C Blue No. 2, including the aluminum lake versions of the these food grade colors, commonly referred to in the trade as simply "lakes." Stated differently, the food grade color added as an ingredient to the potato mash is selected from the group consisting of, individually or in combination, xanthine, monoazo, pyrazolone, triphenylmethane or indigoid food grade colors, or the aluminum salts of the corresponding FD&C dyes extended on a substratum of alumina hydrate.

It is also possible to use, in conjunction with one or more of the food grade colors or lakes of the food grade colors mentioned above, natural colorants. These natural colorants include paprika, annatto, turmeric, carmine and beet extract.

It has been found that these natural colorants are perhaps not as satisfactory as the food grade artificial colorants mentioned above and thus are not preferred for use by themselves to produce the desired color in the end product. It has been found, for instance, that the natural colorants tend not to yield the same color intensity in the formed frozen French fried potato product that might be desirable to consumers. In addition, the natural colorants have a tendency to bleed into the frying oil during frying, thus discoloring the oil and making it difficult to use for other frying operations. Also, formed frozen French fried potato products made with natural colorants may tend to bleed the color onto cooking utensils, paper towels, napkins, fingers of the consumer and the like, upon reconstitution or reheating.

As mentioned above, the particular food grade color or combination of food grade colors that is selected depends upon the desired color in the end potato product. The food grade color or combination of food grade colors can be in a dry form, including powder and granular, or can be in a liquid form, including aqueous and non-aqueous.

In addition to adding one or more coloring agents to the potato mixture, or as an alternative to adding one or more coloring agents to the potato mixture, one or more flavoring agents can be added to the potato mixture. These flavoring agents are added for purposes of producing formed frozen French fried potato products having unique flavor characteristics. The flavoring agents are selected based on the flavor that is desired in the end potato product. It may be possible to obtain the desired flavor though use of a single flavoring, or a blend or combination of flavoring agents may be required.

With the addition of flavoring agents, uniquely flavored frozen French fried potato products can be offered to consumers. Formed frozen French fried potato products can thus be developed which are particularly appealing to certain consumers such as younger children or consumers with particular taste preferences. The potato products can be flavored to produce a snack-type potato product or to simulate other known appealing flavors. For example, it is possible to add flavorings that result in a formed frozen French fried potato product having flavor characteristics similar to breakfast-type foods such as breakfast cereals and French toast, and other flavors such as cinnamon/sugar. With the addition of the appropriate flavoring agent(s), it is also possible to produce formed frozen French fried potato products having a chocolate flavor, cherry flavor, grape flavor, mixed berry flavor, other sweet fruit and sweet citrus flavors, ice cream flavors, honey flavor, vanilla flavor, caramel flavor, maple flavor and others.

Generally speaking, through the selection and addition of appropriate flavoring agents, it is possible to produce formed frozen French fried potato products having a sweet taste. This sweet taste is one of the four basic tastes (i.e., sweet, sour, salty, bitter) recognized throughout the food industry. To achieve this sweet taste, a natural or artificial sweetener (s) is added to the potato mash, possibly with one or more other flavoring agents specifically selected to achieve the desired flavor in the end potato product.

The use of sugar (e.g., granulated sugar) in conjunction with sucralose has been found to be particularly well suited to imparting a desired degree of sweet taste to the formed frozen French fried potato products. Of course, the amount of sugar and the amount of sucralose, and the relative amounts of each, will depend upon the ultimate flavor desired and any other flavoring agents that may be added to achieve the desired flavor. One brand of sucralose that has been found suitable is the Splenda® Brand Sweetener distributed by McNeil Nutritionals. Sucralose is defined as a high intensity sweetener.

Although it might possible to use sugar by itself (i.e., without a high intensity sweetener such as sucralose) to impart the desired degree of sweet taste to the formed frozen French fried potato products, it has been found that the amount of sugar required may adversely affect certain textural characteristics in the end potato product. Thus, with the use of sucralose, the desired degree of sweetness can be achieved without having to use an undesirably large amount of sugar. Further, because sucralose is a relatively expensive product, it is preferable from a cost standpoint to not use sucralose by itself (i.e., without sugar). Also, sucralose by itself may impart a somewhat undesirable aftertaste. Thus, the use of sugar (e.g., granulated sugar) in combination with sucralose provides a good compromise for imparting the desired sweet taste to the formed frozen French fried potato products. Other types of natural and/or artificial sweeteners could also be used, including fruit juice, corn syrup, fructose and sweet flavors.

Another concentrated sweetener product known in the marketplace is Sunette® Brand Sweetener distributed by Nutrrinova. At the present time, this product is not approved for processed vegetable use. However, if Sunette® Brand Sweetener is approved in the future for processed vegetable use, it is believed that such product, used in conjunction with granulated sugar and/or sucralose, may provide better sweet tasting characteristics to the potato product.

As an alternative to formed frozen French fried potato products having a sweet taste, it is possible to impart savory flavors to the formed frozen French fried potato products. Once again, through appropriate selection and addition of one or more flavoring agents to the potato mash, the desired savory flavor can be achieved. Examples of savory flavors include, but are not limited to, cheese flavor, barbeque flavor, ketchup flavor, and sour cream & onion flavor.

As mentioned above, it is possible to add both coloring agents and flavoring agents to the potato mash. In this way, the resulting formed frozen French fried potato product possesses a unique color as well as a unique flavor, thus further appealing to a wide range of consumers.

The ingredients that are added to the potato mash are preferably previously weighed and, after being added, are blended or mixed together with the potato mash for an appropriate amount of time to produce a well-blended potato/ingredient mixture. This may be particularly important insofar as the coloring agents and/or flavoring agents are concerned in that the coloring agents and/or flavoring agents are typically added in relatively small quantities. Thus, the potato mixture including the added ingredients is mixed or blended to ensure complete, uniform and homogeneous incorporation or addition of the ingredients into the potato mixture, including the coloring agents and/or flavoring agents. In addition, the mixing or blending generates shearing of the starch structure that will help produce a relatively uniform extruded product in the extrusion step described below.

Set forth below are some examples of flavored formed frozen French fried potato products that can be produced in accordance with the present invention, and the flavoring agent(s) that can be used to produce the potato product. Also identified are flavored and colored formed frozen French fried potato products that can be produced in accordance with the present invention. The range percentages for the ingredients are listed as weight percentage of the total product.

Cinnamon Flavored

Cinnamon flavor sold by Givaudan Roure: 0.3 wt. %–0.9 wt. %

Granulated sugar: 2.5 wt. %–7.5 wt. %

Sucralose: 0.005 wt. %–0.015 wt. %

Chocolate/Cocoa Flavored

Natural and Artificial Chocolate Flavor sold by Givaudan Roure: 0.15 wt. %–0.60 wt. %

Cocoa sold by Gerkens: 1.0 wt. %–3.0 wt. %

Granulated sugar: 5.0 wt. %–15.0 wt. %

Sucralose: 0.01 wt. %–0.03 wt. %

Sour Cream and Onion Flavored

Sour Cream & Onion Seasoning

Blend sold by HydroBlend: 2.0 wt. %–4.75 wt. %

Green Color and Fruit Flavor

Natural and Artificial Fruit Flavor sold by Givaudan Roure: 0.075 wt. %–0.225 wt. %

FD&C Yellow No. 5: 0.00175 wt. %–0.00525 wt. %

FD&C Blue No. 1: 0.0005 wt. %–0.0015 wt. %

Yellow Color and Savory Flavor

Dehydrated Granulated Onion sold by Gilroy: 0.005 wt. %–0.015 wt. %

Replacer for MSG sold by Ottens: 0.001 wt. %–0.025 wt. %

FD&C Yellow No. 5: 0.00025 wt. %–0.0075 wt. %

Red Color and Savory Flavor

Dehydrated Granulated Onion sold by Gilroy: 0.005 wt. %–0.015 wt. %

Replacer for MSG sold by Ottens: 0.001 wt. %–0.025 wt. %

FD&C Red No. 40: 0.004 wt. %–0.012 wt. %

Blue Color and Savory Flavor

Dehydrated Granulated Onion sold by Gilroy: 0.005–0.015 wt. %

Replacer for MSG sold by Ottens: 0.001–0.025 wt. %

FD&C Blue No. 1: 0.002 wt. %–0.005 wt. %

FD&C Blue No. 2 lake (21%): 0.002 wt. %–0.005 wt. %

Orange Color and Savory Flavor

Dehydrated Granulated Onion sold by Gilroy: 0.005 wt. %–0.015 wt. %

Replacer for MSG sold by Ottens: 0.001 wt. %–0.025 wt. %

FD&C Yellow No. 6: 0.0035 wt. %–0.0105 wt. %

Purple Color and Savory Flavor

Dehydrated Granulated Onion sold by Gilroy: 0.005 wt. %–0.015 wt. %

Replacer for MSG sold by Ottens: 0.001 wt. %–0.025 wt. %

FD&C Blue No. 1: 0.019 wt. %–0.006 wt. %

FD&C Blue No. 2 lake (21%): 0.009 wt. %–0.0281 wt. %

Referring back to FIG. 1, once the ingredients (including the coloring agents and/or the flavoring agents) have been mixed or blended, the resulting potato mixture is formed into French fried potato products by extruding the mixture through extrusion equipment, such as that described in U.S. Pat. No. 4,082,855. Generally speaking, any currently commercially available, food grade extrusion equipment can be used to extrude the mixture through an extrusion head and die to form an elongated potato product (e.g., an elongated potato product with ridges such as a crinkle cut potato product) such as those used to extrude licorice, pasta, and the like. The potato mixture can also be formed into the desired form using other types of equipment. Also, the potato mixture can be shaped into formed potato products having a shape other than an elongated shape. Other shapes include, but are not limited to, alphanumeric characters or symbols of any alphabet, animals, children story characters, including currently-popular characters such as POKEMON® branded characters, dancing bears, etc. Formed potato products having these or other shapes, and also possessing one of the color and/or flavor characteristics described above represent a unique consumer product having potentially great appeal to different segments of consumers, particularly consumers that may not have had a significant interest in frozen French fried potato products until now.

Once the potato products have been formed into the desired shape or configuration, the formed potato products are then parfried. The formed potato products can be parfried at a temperature and for a duration similar to that typically employed for parfrying formed potato products. Preferably, the potato pieces are parfried in food grade oil at about 270° F.–395° F., preferably at about 330° F.–395° F., and more preferably at 345° F.–395° F. for a period of 30–180 seconds. Following the parfrying the potato pieces are frozen and then packaged in the known manner. The consumer would then reheat or reconstitute the frozen formed French fried potato products by baking (e.g., in an oven or toaster oven), deep fat frying, or microwave cooking.

Figure 2:
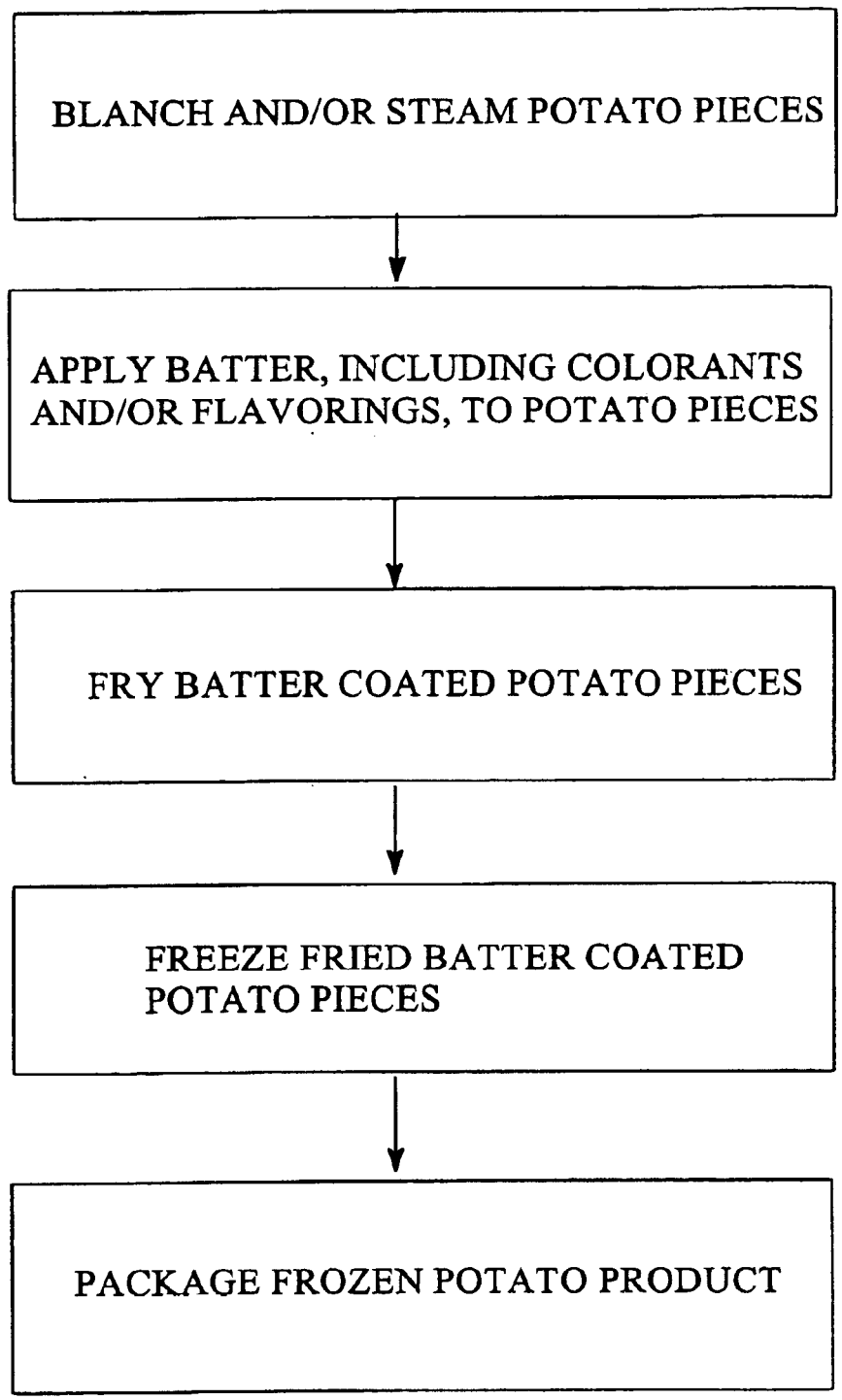
FIG. 2 is a process flow diagram illustrating another process in accordance with the present invention for producing French fried potato products having unique color and/or flavor characteristics.

Frozen French fried potato products having unique color and/or flavor characteristics can also be produced using a different method or process such as illustrated in FIG. 2. Here, rather than producing formed potato products from a potato mash, the potato products are produced from raw potato pieces. In accordance with this method, raw potato pieces are prepared in a conventional manner by optionally peeling and cutting potatoes into desired shapes (e.g., the traditional elongated shape as well as a variety of other shapes). The potato pieces are then partially cooked in a water bath and/or steam chamber to swell and gelatinize the potato starch over the exposed surfaces of the pieces.

The partially cooked potato pieces are then immersed in a starch-based or flour-based batter solution. The batter solution is similar to known batter solutions that have been used in the past to apply a batter coating to the potato pieces so that the frozen French fried potato product is better able to maintain its crispness characteristics for a longer period of time after being reheated or reconstituted by the consumer. The batter solution can be either a flour based solution or a starch based solution.

Set forth below is an example of a wheat flour based batter solution (solids range at 40%–50%) that can be employed.

Wheat flour: 40%–80%

Cornstarch: 10%–20%

Modified Food Starch: 5%–10%

Salt: 5%–15%

Leavening: 0.5%–1.0%

Gum: 0.1%–1.0%

Set forth below is an example of a starch based batter solution (solids range at 36%–48%) that can be employed.

Modified food starch: 40%–70%

Cornstarch: 15%–25%

Rice flour: 1.0%–20%

Salt: 5%–15%

Leavening: 0.5%–2.0%

Gum: 0.1%–1.0%

The difference in the batter solution used here resides in the addition of coloring agents and/or flavoring agents to the batter solution. The coloring agents added to the batter solution can be the same as those described in connection with the formed potato products. The coloring agent is added for purposes of imparting a unique and desired color to the finished frozen French fried potato product. Any certified food grade color can be used in the batter solution. Preferred food grade colors, used individually or in blends, include FD&C Red No. 3, FD&C Red No. 40, FD&C Red No. 2, FD&C Yellow No. 6, FD&C Yellow No. 5, FD&C Green No. 3, FD&C Blue No. 1 and FD&C Blue No. 2, or the aluminum lake versions of these colors (i.e., lakes). Stated differently, the batter solution can contain food grade color selected from the group consisting of, individually or in combination, xanthine, monoazo, pyrazolone, triphenylmethane or indigoid food grade colors, or the aluminum salts of the corresponding FD&C dyes extended on a substratum of alumina hydrate. In addition, as noted above, natural color substitutes including tumeric, annatto, carmine and beet extract can be utilized, although it is preferred that these natural colorants be used in combination with one or more of the food grade color(s) or lakes mentioned above.

Consistent with the description set forth above, in addition to adding one or more coloring agents to the batter solution, or as an alternative to adding one or more coloring agents to the batter solution, one or more flavoring agents can be added to the batter solution. The addition of these flavoring agents results in frozen French fried potato products having unique flavor characteristics. The flavoring agent or combination (blend) of flavoring agents is selected based on the flavor that is desired in the end potato product.

The types of flavoring agents that can be employed are similar to those described above. Thus, for instance, to produce a frozen French fried potato product having a sweet taste, a natural or artificial sweetener(s) is added to the batter solution, possibly also with one or more other flavoring agents specifically selected to achieve the desired flavor in the end potato product. As mentioned above, sugar (e.g., granulated sugar) can be used in conjunction with sucralose to achieve a desired degree of sweet taste. Similarly, upon receiving appropriate approval for use with processed vegetables, Sunette® Brand Sweetener could be used in conjunction with granulated sugar and/or sucralose.

Savory flavors similar to those described above can also be imparted to frozen French fried potato product through the appropriate selection and addition of one or more flavoring agents to the batter solution.

In addition, both coloring agents and flavoring agents can be added to the batter solution to ultimately result in frozen French fried potato products having a unique color as well as a unique flavor.

The temperature of the colored and/or flavored batter solution may range from 35° F.–70° F., more preferably 55° F.–65° F. By way of example, the potato pieces can be immersed in the colored and/or flavored batter solution for a period of 2 sec.–60 sec., more preferably 2 sec.–15 sec. The potato strips or pieces are then recovered from the batter solution and allowed a short amount of batter set time, with or without the use of an air knife to remove excess batter.

The potato pieces recovered from the batter solution are further cooked by, for example, par-frying. Preferably, the potato pieces are par-fried in food grade oil at about 270° F.–395° F., preferably at about 330° F.–395° F., and more preferably at 345° F.–395° F. for a period of 30–180 seconds.

It is to be understood that the par-frying time varies based on the size and shape of the potato pieces as well as the final color desired. By way of example, for crinkle cut potato pieces, par-fried times of about 40–180 seconds are utilized.

Using known and conventional techniques, the colored and/or flavored par-fried or otherwise cooked potato pieces are then cooled and frozen, and subsequently packaged. The resulting frozen French fried potato products are then suitable for reheating or reconstituting at an appropriate temperature and time in an oven, toaster oven, microwave or deep frying.

As described above in connection with the process shown in FIG. 2, the potato pieces are at least partially cooked, immersed in the colored and/or flavored batter solution, and then frozen and packaged. It may be desirable in some instances to process the potato pieces in a slightly different manner by at least partially cooking the potato pieces, frying (parfrying) them and then freezing them, immersing the frozen potato pieces in the colored and/or flavored batter solution mentioned above, followed by once again frying them and them freezing and packaging them.

The potato pieces produced in accordance with the process described above are unique in color and color intensity from potatoes known in the trade which lack FD&C color compounds or aluminum salts of the corresponding FD&C dyes extended on a substratum of alumina hydrate. It is thus possible to produce frozen French fried colored battered potato pieces that are, for example, red, blue, orange, yellow, green or purple in color upon emerging from the colored batter solution and subsequently processed. Of course, other colors or variations on the aforementioned colors are also possible.

In addition, the frozen French fried potato products produced in accordance with the process described above are unique in flavor compared to other frozen French fried potato products known in the trade, particularly with respect to the incorporation of a sweet taste into the frozen French fried potato products. It is thus possible to produce frozen flavored French fried battered potato products that are unique to the industry and appealing to a wide variety of tastes and preferences.

Further, in accordance with the process described above, it is possible to produce frozen French fried battered potato products having unique color and flavor combinations.

It is to be understood that it is also possible to produce a colored and/or flavored formed potato product in a manner slightly different from that described above in connection with FIG. 1. That is, rather than add the color agents and/or flavor agents to the potato mash to impart the desired color and/or flavor characteristics prior to processing the potato mash into the desired form, the desired color and/or flavor characteristics can be imparted to the potato product after the potato mash is processed into the desired form (e.g., after extruding). Thus, after the potato mash is processed (e.g., extruded) into the desired form, the formed potato product can be immersed in the colored and/or flavored batter solution described above in connection with FIG. 2.

Also, when producing a potato product having both color and flavor characteristics as described above, it is possible to produce the potato mash as described above, add either the coloring agent(s) or the flavoring agent(s) to the potato mash, form the potato pieces into the desired form or shape, and then pass the formed potato pieces through the batter solution containing the other of the coloring agent or the flavoring agent (i.e., the coloring agent or flavoring agent not added to the potato mash).

It is also possible to apply encapsulated sugar and other topical additions to the outer surface of the frozen French fried potato products having unique color characteristics and/or unique flavor characteristics as described above. A U.S. patent application Ser. No. 10/098,348 filed on even date herewith and entitled "Frozen French Fried Potato Product With Topical Addition" describes frozen French fried potato products in which unique topical additions such as sugar, particularly encapsulated topical additions such as encapsulated sugar, are applied to the outer surface of frozen French fried potato pieces to produce a frozen French fried potato product having unique taste and possibly visual characteristics. A frozen French fried potato product having color and/or flavor characteristics as described above and topical additions as described in the aforementioned application, the entire disclosure of which is incorporated herein by reference, would provide an even more unique frozen French fried potato product.

The principles, preferred embodiments and production processes of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for preparing a potato product comprising:
   producing potato pieces having a desired shape from potatoes; and
   passing the potato pieces through a batter solution containing a food grade color selected from the group consisting of, individually or in combination, xanthine, monoazo, pyrazolorte, triphenylmethane, indigoid color compounds and aluminum salts of xanthine, monoazo, pyrazolone, triphenylmethane and indigoid color compounds extended on a substratum of alumina hydrate.

2. The method of claim 1, wherein the potato pieces are produced by cutting a potato into the potato pieces and at least partially cooking the potato pieces in a water bath or a steam chamber to swell and partially gelatinize potato starch in the potato pieces before passing said pieces through the batter solution.

3. The method of claim 2, wherein the potato pieces that are at least partially cooked are dried before passing the potato pieces through the batter solution.

4. The method of claim 1, including removing the potato pieces from the batter solution and parfrying the potato pieces.

5. The method of claim 1, wherein the potato pieces are produced by forming a potato mash from the potatoes and extruding the potato mash to form the potato pieces.

6. The method of claim 1, including adding a natural or artificial sweetener to the batter solution before passing the potato pieces through the batter solution to impart a sweet taste to the potato pieces.

7. The method of claim 1, including adding granulated sugar to the batter solution before passing the potato pieces through the batter solution.

8. The method of claim 1, including adding granulated sugar and sucralose to the batter solution before passing the potato pieces through the batter solution to impart a sweet taste to the potato pieces.

9. A method of preparing potato products comprising:
   at least partially cooking potatoes in a water bath or a steam chamber;
   producing potato mash from the at least partially cooked potatoes;
   mixing the potato mash with a food grade color to produce a colored potato mixture;
   forming the colored potato mixture into potato pieces;
   frying the potato pieces; and
   freezing the potato pieces.

10. The method of claim 9, wherein the potato mash is also mixed with a natural or artificial sweetener that includes granulated sugar.

11. The method of claim 9, wherein the potato mash is mixed with cocoa and chocolate flavor.

12. The method of claim 9, wherein the potato mash is mixed with artificial cinnamon flavor.

13. The method of claim 9, wherein the food grade color is selected from the group consisting of, individually or in combination; xanthine, monoazo, pyrazolone, triphenylmethane, or indigoid color compounds or aluminum salts of xanthine, monoazo, pyrazolone, triphenylmethane and indigoid color compounds extended on a substratum of alumina hydrate.

14. The method of claim 9, wherein the potato mash is also mixed with an artificial or natural sweetener.

15. A method preparing potato products comprising:
   at least partially cooking potatoes in a water bath or a steam chamber;
   producing potato mash from the at least partially cooked potatoes;
   mixing the potato mash with an artificial or natural sweetener that includes sucralose optionally a food grade to produce a potato mixture;
   forming the potato mixture into potato pieces;
   frying the potato pieces; and
   freezing the potato pieces then.

16. The method of claim 15, wherein the potato mash is also mixed with food grade color.

17. A prepared colored French fried potato product comprising:
   potato pieces which have been passed through a colored batter solution containing food grade color to coat the potato pieces and impart color to the potato pieces, and subsequently fried;
   the food grade color in the batter solution being selected from the group consisting of, individually or in combination, xanthine, monoazo, pyrazolone, triphenylmethane, indigoid color compounds and aluminum salts of xanthine, monoazo, pyrazolone, triphenylmethane and indigoid color compounds extended on a substratum of alumina hydrate.

18. The prepared colored French fried potato product of claim 17, wherein the potato pieces are formed potato pieces produced from a potato mash.

19. The prepared colored French fried potato product of claim 17, wherein the potato pieces are cut from raw potatoes.

20. The prepared colored French fried potato product of claim 17, wherein the batter solution also includes an added artificial or natural sweetener.

21. The prepared colored French fried potato product of claim 17, wherein the potato pieces are frozen.

22. A prepared sweet flavored French fried potato product comprising:

potato pieces produced through addition of an artificial sweetener to impart a sweet taste to the potato product and subsequently fried and wherein the potato pieces also contain a food grade color selected from the group consisting of, individually or in combination, xanthine, monoazo, pyrazolone, triphenylmethane, indigoid color compounds and aluminum salts of xanthine, monoazo, pyrazolone, triphenylmethane and indigoid color compounds extended on a substratum of alumina hydrate.

23. The prepared sweet flavored French fried potato product of claim 21, wherein the artificial sweetener includes sucralose.

24. The prepared sweet flavored French fried potato product of claim 22, the artificial sweetener includes sucralose.

25. The prepared sweet flavored French fried potato product of claim 22, wherein the potato pieces also contain added cocoa and chocolate flavor.

26. The prepared sweet flavored French fried potato product of claim 21, wherein the potato pieces also contain artificial cinnamon flavor.

27. The prepared sweet flavored French fried potato product of claim 22, wherein the potato pieces are formed potato pieces produced by forming potato mash containing the artificial sweetener.

28. A method of preparing potato products comprising:

at least partially cooking potatoes;

producing potato mash from the at least partially cooked potatoes; mixing the potato mash with sucralose and sugar to produce a potato mixture;

forming the potato mixture into potato pieces;

frying the potato pieces; and then freezing the potato pieces.

29. A method for preparing a potato product comprising:

producing potato pieces having a desired shape from potatoes; and passing the potato pieces through a flour-based or starch-based batter solution containing a food grade color selected from the group consisting of, individually or in combination, xanthine, monoazo, pyrazolone, triphenylmethane, or indigoid color compounds or aluminum salts of xanthine, monoazo, pyrazolone, triphenylmethane and indigoid color compounds extended on a substratum of alumina hydrate.

30. A prepared colored French fried potato product comprising:

potato pieces which have been passed through a colored flour-based or starch-based batter solution containing food grade color to coat the potato pieces and impart color to the potato pieces, and subsequently fried;

the food grade color in the batter solution being selected from the group consisting of, individually or in combination, xanthine, monoazo, pyrazolone, triphenylmethane, or indigoid color compounds or aluminum salts of xanthine, monoazo, pyrazolone, triphenylmethane and indigoid color compounds extended on a substratum of alumina hydrate.

* * * * *